United States Patent
Rein et al.

(10) Patent No.: US 11,972,746 B2
(45) Date of Patent: Apr. 30, 2024

(54) METHOD AND SYSTEM FOR HYBRID AI-BASED SONG CONSTRUCTION

(71) Applicant: BELLEVUE INVESTMENTS GmbH & Co. KGaA, Berlin (DE)

(72) Inventors: Dieter Rein, Berlin (DE); Jurgen Jaron, Berlin (DE)

(73) Assignee: BELLEVUE INVESTMENTS GMBH & CO. KGAA (DE)

( * ) Notice: Subject to any disclaimer, the term of this patent is extended or adjusted under 35 U.S.C. 154(b) by 758 days.

(21) Appl. No.: 16/571,395

(22) Filed: Sep. 16, 2019

(65) Prior Publication Data
US 2020/0090632 A1    Mar. 19, 2020

Related U.S. Application Data

(60) Provisional application No. 62/731,193, filed on Sep. 14, 2018.

(51) Int. Cl.
*G10H 1/00* (2006.01)
*G06N 5/02* (2023.01)
*G06N 20/00* (2019.01)

(52) U.S. Cl.
CPC ........... *G10H 1/0025* (2013.01); *G06N 5/027* (2013.01); *G06N 20/00* (2019.01); *G10H 2210/105* (2013.01); *G10H 2220/101* (2013.01)

(58) Field of Classification Search
CPC ........... G10H 1/0025; G10H 2210/105; G10H 2220/101; G06N 20/00; G06N 5/027
See application file for complete search history.

(56) References Cited

U.S. PATENT DOCUMENTS

| | | | | |
|---|---|---|---|---|
| 7,678,984 B1* | 3/2010 | Lamere | ................ | G10H 1/0033 84/634 |
| 8,069,036 B2* | 11/2011 | Pauws | .................. | G11B 27/034 381/1 |
| 2012/0312145 A1* | 12/2012 | Kellett | ..................... | G10H 1/38 84/613 |
| 2017/0092248 A1* | 3/2017 | Gozzi | .................. | G10H 1/0025 |

FOREIGN PATENT DOCUMENTS

JP         2010164825 A    *   7/2010

* cited by examiner

*Primary Examiner* — Jianchun Qin
(74) *Attorney, Agent, or Firm* — Fellers, Snider, Blankenship, Bailey & Tippens, P.C.; Terry L. Watt

(57) ABSTRACT

According to an embodiment, there is provided a system and method for automatic AI-based song construction based on ideas of a user. It provides and benefits from a combination of expert knowledge resident in an expert engine which contains rules for a musically correct song generation and machine learning in an AI-based audio loop selection engine for the selection of fitting audio loops from a database of audio loops.

13 Claims, 3 Drawing Sheets

METHOD AND SYSTEM FOR HYBRID AI-BASED SONG CONSTRUCTION

CROSS REFERENCE TO RELATED APPLICATIONS

This application claims the benefit of U.S. Provisional Patent Application Ser. No. 62/731,193 filed on Sep. 14, 2018, and incorporates said provisional application by reference into this document as if fully set out at this point.

TECHNICAL FIELD

This disclosure relates generally to methods of editing and generating audio content and, in more particular, to methods utilizing a combination of collected and stored expert knowledge and machine learning in an artificial intelligence-based ("AI") selection engine for automatic audio song construction.

BACKGROUND

Creation of a musical work has been a goal and dream of many people for as long as music has been around. However, a lack of knowledge of details regarding the intricacies of musical styles has prevented many from writing or generating music. As such, this endeavor has, for a very long time, been the purview of individuals having the necessary knowledge and education.

With the advent of the personal computer and other computerized devices (e.g., tablet computers) and the widespread adoption of these devices in the home consumer market, software products emerged that allowed a user to create original music without the need to know music theory or needing to understand the terminology of music constructs such as measures, bars, harmonies, time signatures, key signatures, etc. These software products feature graphical user interfaces that provide users with a visual approach to song and music content creation that allowed the novice user easy access to the tools useful in music generation and enabled the users to focus on the creative process without being hampered by having to learn the intricacies of music generation.

In addition to increasing the accessibility of music generation, the content that is available and usable in the process of generating music has also been adapted to correspond to the directive of supplying an easy to use music generation approach. These sorts of programs typically provide a number of individual sound clips of compatible length, e.g., sound loops or just "loops", which can be selected and inserted into the multiple tracks of an on-screen graphical user interface as part of the process of music creation. With these sorts of software products the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of the graphical user interface of a mobile or desktop based software product according to their own taste and are therefore potentially able to generate individual verses and maybe the refrain of their own song.

A complete song or a complete musical composition however is normally, for example, at least two minutes long and includes more than only one song part, e.g., up to 16 individual song parts might be used to generate a sonically pleasing composition. To generate so many song parts with the necessary enthusiasm and eye for detail exceeds the patience and endurance of most users and these users often end the creation process in frustration without completing a musical work, obtaining one that is of insufficient length, or obtaining a work that is not musically satisfying. In addition to these problems on the creative and user interface side of the creation process, repeated discontinuation of the creation process of a song or music piece may result in permanent abandonment of the software product itself which is also not desirable either for the user or the provider of the software since completion of the project provides the user with positive feedback in the form of pride in having completed the project which potentially also results in a favorable impression of the software tool used to do that. Additionally, given the prevalence of social media, production of a musically appealing composition can result in approval from a valued online community when the work is posted which, in turn, encourages the undertaking of additional music creation projects.

Thus what is needed is a system and method that allows a user to complete the song or music generation process and produce a result that is a musically pleasing complete song or music piece. What is also needed is a system and method that provides the user with expert guidance in creating the work, where the guidance is based on collected and evolving expert knowledge and machine learning in a AI-based system for selection and positioning of suitable audio loops consistent with a user's end goal Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment, there is provided a system and method for hybrid AI-based song or music piece construction. In one embodiment the algorithm is integrated into a music generation/song construction process and comprises a combination of expert knowledge in an expert engine and the utilization of machine learning processes in an AI-based loop selection and provision engine. The expert engine provides information and support for the user to make sure that the song construction process is musically correct regarding a preferred song structure, wherein the AI engine is directed to suggest and provide proper and fitting audio loops consistent with the user's musical goal.

It should be clear that an approach such as this would be a tremendous aid to the user and would additionally mean a assistance in the development and the creation of professional music pieces/songs, wherein the formerly tedious and often frustrating process of manually generating song parts and filling these song parts with fitting audio loops is simplified and amplified by expert knowledge and machine learning based information. Therefore this approach delivers functionality to the user of music creation programs which enables a user to continue and complete the music generation process satisfactory or even automate the music generation process completely. Additionally, due to the fact that the provision and selection of available and potentially usable audio loops is based on machine learning information that is selecting content independent from style based limitations, the user is potentially provided with options regarding the audio loop selection that he or she might never have imagined, therewith a music piece/song could potentially benefit extraordinarily from such a style limitation breaking suggestion of audio loops.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
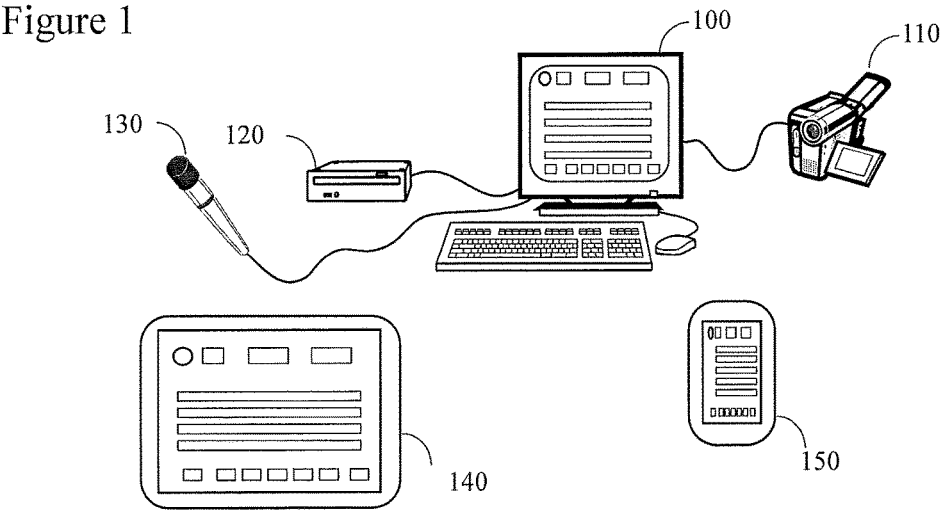
FIG. 1 is an illustration of a working environment of the instant invention according to an embodiment.

While this invention is susceptible of embodiment in many different forms, there is show in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software running on a user's computer 100 or other device with a CPU such a table computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort be utilized with—and will be preferably be connectable to—the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally, a microphone 130 might be utilized so that the user can add voice-over narration to a multimedia work and a CD or DVD burner 120 could be useful for storing in-progress or completed works. Further, it might also be possible and is shown in FIG. 1 that the process of the instant invention might be implemented on portable tablet computer devices 140 or on mobile devices, such as smart phones 150.

Figure 2:
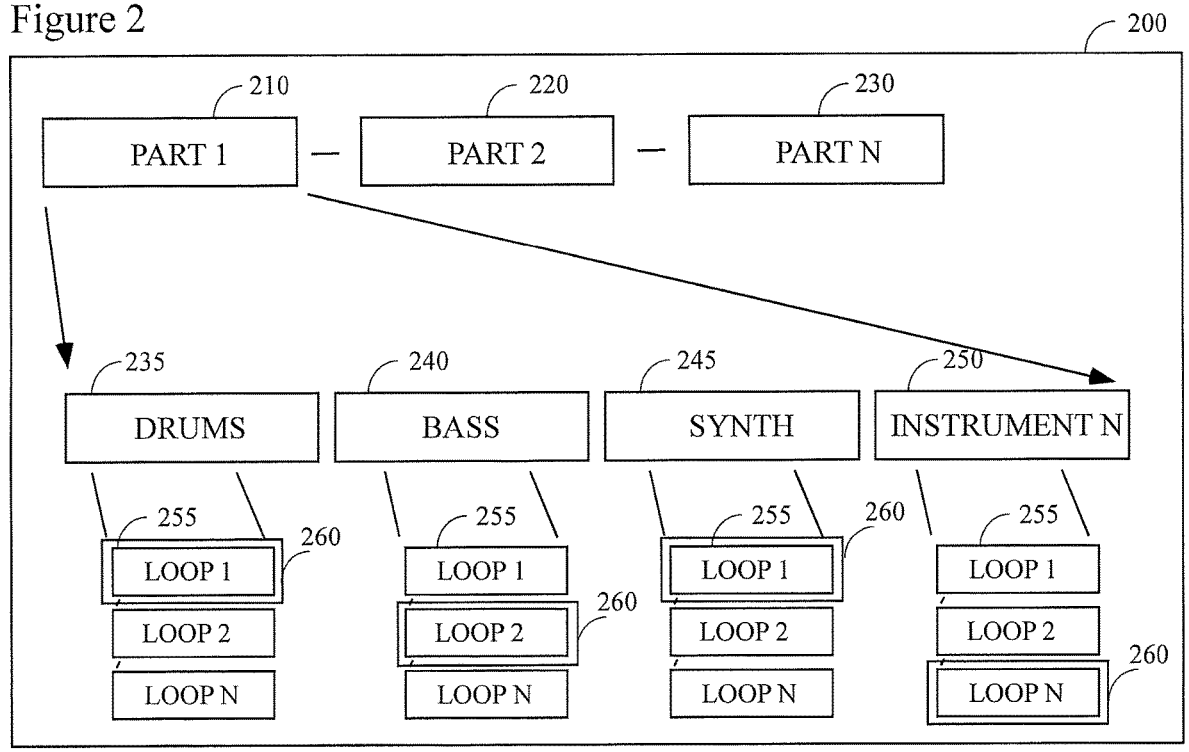
FIG. 2 depicts a general and basic structure of a song or portion of a song according to an embodiment of the instant invention.

Turning next to FIG. 2, this figure illustrates the skeletal structure of a song or a music piece 200 according to an embodiment. This structure functions as the starting point for the functionality of the instant invention. A song or music piece generated by an embodiment of the software product will consist of a plurality of individual song parts which is illustrated by part 1 210 and part 2 220 in FIG. 2, where the denomination of part N 230 is used to show that a potential song or music piece might consist of an arbitrary number of parts. Each part has a specific runtime at a given tempo, which might be selected and defined by the user, alternatively the run time might be strictly defined as being, for example, 4 or 8 measures or multiples thereof. Additionally these parts might be further specified by, for example, designating them as being an intro or an ending. FIG. 2 also generally indicates that each part of a song or music piece preferably consists of an arbitrary number of instruments, wherein audio loops that sound these instruments are supplied accessible to the user and the AI engine discussed below, an audio loop being a digital section of sound material that usually may be seamlessly repeated, i.e., "looped". Further details with respect to the figure are presented below.

In FIG. 2 the instruments drums 235, bass 240 and synth 245 are depicted, which is not meant to limit the specification of the instant invention to only these instrument variations, on the contrary it should be clear that a plurality of other instrument choices are certainly possible, and the limitation to these three instruments in this figure is only for illustrative purposes. Also instrument N 250 is depicted as being chosen to illustrate this fact, where N stands for an arbitrary number of instruments. For each of the available and potentially selected instruments at least one audio loop 255 at a time is selectable 260 and therewith being replayed during the play time of the particular part. The selection of each audio loop is either carried out by the user manually or automatically by the instant invention.

Figure 3:
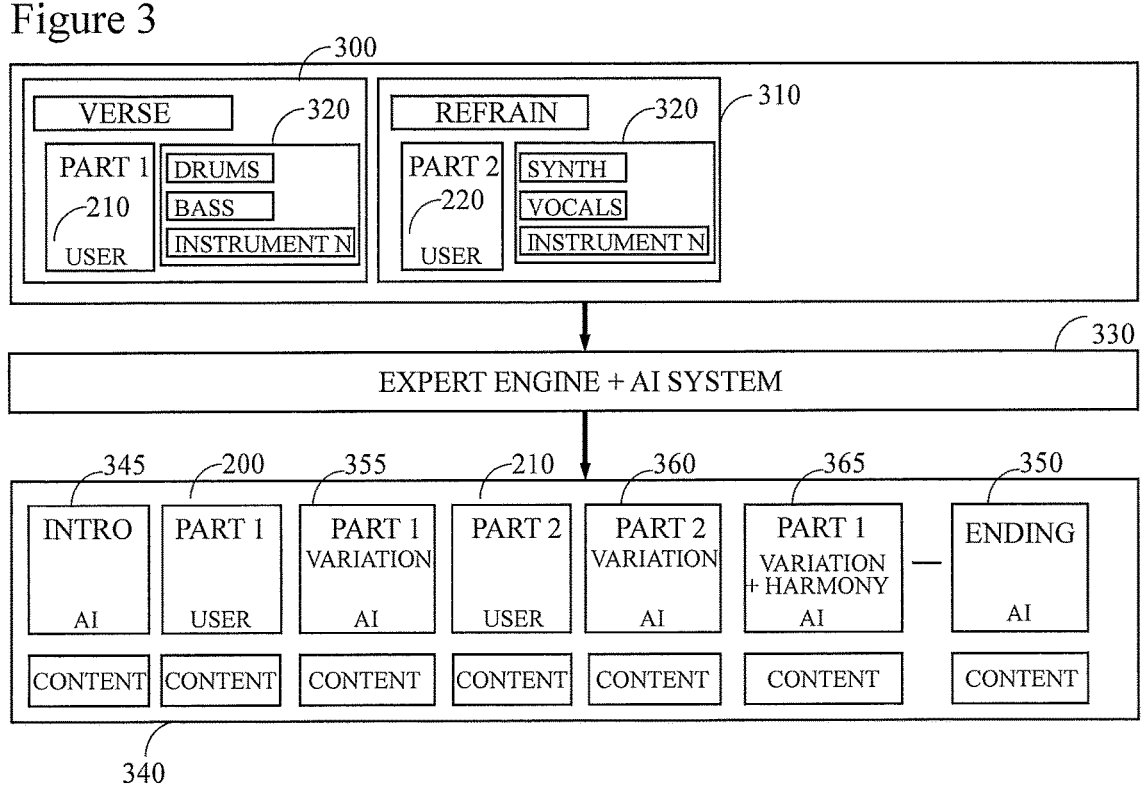
FIG. 3 illustrates a high level view of the interaction of the parts of an embodiment.

FIG. 3 gives additional details of the process of constructing a skeleton. The structure or skeleton of a song is depicted there. In this example, a song is constructed of 8 individual sections, which might be an intro 345, an ending 350, all of the user supplied sections with their content 200 and 210, and, in this particular example, a mixture of variations of these supplied parts (355, 360 and 365). In addition, parts might be added to the skeleton to lengthen the runtime of the work. So, in this example the skeleton basically includes an intro and an ending and in between the user parts plus variations of these parts and new parts, the variations and new parts preferably being chosen and automatically added by the expert engine. Of course, other song parts might be available including, for example, a song bridge, a song refrain/chorus, pre-chorus, etc.

The AI system uses the skeleton model as a starting point and the skeleton model has the song structure planned, i.e., the Parts, Style, Instruments and so on. To fill in the gaps in the skeleton model the AI system looks at each empty part and its desired content (as specified by the skeleton) and fills it with loops consistent with the requirements of those parts. The AI system has access to all of the loops and information about all the loops in the loops database and their associated auditory properties. The AI system may or may not select a loop from a from a style that is normally used to, for example, to generate a blues song if "Blues" is the selected style. But, if the AI system determines that the auditory properties of a loop in the database are sonically compatible then it may select that loop for insertion into the skeleton, independent from the style association of that loop.

In one preferred embodiment the selected audio loop is played during the whole runtime of the part to which its parent instrument belongs, however it is also possible that the user may select and de-select or switch individual audio loops during the runtime of the particular part. The instant invention provides and utilizes an evolving and growing database of audio loops, wherein the audio loops are categorized according to one or more particular styles, for example EDM, 50s, Drum'n Bass and House. Each individual style features a plurality of different instruments associated with it and each instrument has a number of associated audio loops, i.e., audio loops in which the instrument sounds when the loop is played (e.g., recorded). Of course, there might be one or multiple instruments recorded in a loop. Also, in some cases, the loop might not contain traditional audio recordings of an acoustic instrument but might contain computer generated sounds that resemble (or not) traditional instruments. Either way, when it is said that an instrument is recorded in a loop that term should be broadly construed to cover instances where there is a digital audio recording of that instrument as well as cases where the audio material in the loop is computer generated. This database will preferably be updated on a regular basis with new styles being added, existing styles being updated or deleted, etc. Preferably these updates will be delivered over the Internet for free or in exchange for a particular payment option.

Talking further about FIG. 3, this figure illustrates the interaction of the participating parts of an embodiment of the instant invention in a compressed form. Preferably in most cases, the instant invention will begin with a fragmented song or music piece, comprised of at least one, and preferably two, selected and defined song parts, usually a verse 300 and a chorus or refrain 310 of a music piece. These song parts are generated and provided with audio content 320 by a user, the content preferably being audio loops selected by the user. This song fragment might be the starting point for the instant invention; alternatively the starting point might be the selection of a music style, or a seed song from a song library. For each of the different starting points the following steps are the same in this embodiment—the starting data (e.g., loops/variation/style/volume or intensity or dynamic, etc.) is selected by the user and provided to the combination of the expert engine and the AI system 330. This combination will preferably proceed to sequentially process the existing user-defined starting point and as a result provide a complete song 340 for review by the user. Additionally, the user might influence the song creation process by specifying a desired tempo or preferences regarding the dynamics progression of a song (for example—the beginning should be calm—in the middle it is aggressive and at the end energetic).

By way of additional details, in certain embodiments an expert engine will analyze the user defined or selected song parts which to identify a preferred style. Based on the style a song length will be chosen by the expert engine that is compatible with that style. That is, the expert engine will contain rules, guidelines, preferences, etc., provided by experts who are familiar with a particular style of musical work, collectively "rules" hereinafter. That being said, it should be understood that these guidelines might (or might not) be strict rules, but instead are more general preferences. The rules that are accessible by the expert engine might include things such as the length of the song, preferential chord change patterns, preferable instruments, preferable tempos, preferable percussion patterns, etc. Thus, the user may, for example, override the suggest song length and choose an alternative length if that is desired. Given the identified or selected style, the following sorts of decisions can be made by the expert engine as part of the music work creation process:

the song skeleton can be generated;
instruments/voices/loops can be selected;
a harmonic progression can be selected;
the dynamics dramaturgy of the musical work can be determined for the musical that is to be created;
the range of variation that is permitted in the selected loops for that style can be established, e.g., how many loops can be changed and how different from the loops already in use a newly selected loop can be, etc. (i.e., a "variance setting" hereinafter, described in greater detail below).

To better understand the capabilities of the expert system, it may be useful to understand how an embodiment is constructed. The expert system is a conglomerate of information gathered from music experts who were asked to provide information about how a particular song in a selected style should be built within the confines of a loop based music generation system. So this is like a curated system that is constantly updated and a living/constantly updated system which is incremented from constant new additions or changes to the contents of the expert system.

With respect to the AI system, this system has access to a loops database, with each loop being associated with one or more different compatible music styles or genre (e.g., African, Arabic, Asian, blues, country, electric, folk, hip hop, jazz, Latin, pop, R&B/soul, rock, classical, etc.). The AI is trained with all the loops independent of the styles, meaning that the AI system also has access to the loops, their auditory properties (calm/aggressive, singer, no singer, female singer etc.), their lengths, tempos, dynamics and key and the associated instrument and style.

The AI system uses the skeleton model as a starting point and the skeleton model has the song structure planned, i.e., Parts, Style, Instruments and so on. To fill in the gaps of the skeleton model the AI system looks at each part and its desired content and fills it, even if the style of the loop is different from the requested style. So, the AI system need not use the designated style in selecting loops. That is one thing that is unique about this embodiment—there are no style boundaries with the AI system. This is because the AI system, although it might have access to all loops in the database and their associated auditory properties including a preferred style, can use other information to select a loop that might be from a style that is not normally used with the designated song style. If the style is "blues" and the AI system identifies a loop from a different style that is compatible, that loop might still be selected and inserted into the skeleton.

The loop selection process is based on the auditory properties and particular characteristics of the song skeleton and the instrument type. So, for example, a loop might be stored in the database of the AI together with a number of performance-related parameters values such as its length (in beats, measures, run time, etc.), a preferred tempo, its timbre, a measure of its harmonic compatibility (e.g., is it in major or minor key, are there particular styles that it is incompatible with, can it be transposed without loss of quality to the current key, etc.), rhythmic information (e.g., is it syncopated, straight time,—properties of music). These values are stored for each loop in a database and the AI utilizes some or all of these performance parameters when selecting new loops. When an embodiment of the instant AI system is instructed to fill in a song skeleton, it will first look at the user-supplied loops (provided by the user in the parts, e.g., parts 200 and 210). It will also determine the instruments associated with each loop, i.e., which instruments each loops expresses. The AI will analyze the music parameters and select loops for insertion for which the values (in view of all music properties) are within a defined threshold and belong to a particular instrument. It may be clear now that the type of skeleton does not necessarily control the loop selection process to any great extent. The loop selection process is more focused on the previously selected user-chosen loops. However, the type of instruments associated with the skeleton also contributes to the loop selection process.

The completed song preferably consists of a proper intro section 345 and ending section 350, any pre-existing user generated song parts 210, 220 and a plurality of additional song parts that have been generated according to structural requirements defined by the expert engine and filled with appropriate content provided and proposed by the AI system, so, for example, the AI system may select different audio loops for the vocal instrument selected in original part 2 220 and the expert engine may determine it structurally inconsistent to have different audio loops in the vocals instrument and may delete the vocal instrument completely, thereby generating a variation 360 of original Part 2.

Instead of changing or deleting specific audio loops from the different parts and instruments other options are also available for the generation of variations of the selected parts, for example the expert system may change the harmony of the part, the bpm (beats per minute) of the song part, create a harmonic progression for the selected part, change the intensity of effects over the running time of the selected part—all these options resulting in a variation of an original part. The instant invention additionally provides a global setting for the variance whose spectrum might be definable by the user and which ensures that for each iteration of the instant invention different but still fitting audio loops are selected and inserted. With this variance setting the system will preferably be able to generate many different variants of a song or music piece in a very short amount of time, wherein all these variants are based on the initial song ideas from the user. Additionally to the global setting for the variance it might also be possible that the variance setting might be applied to individual song parts only.

As an example, suppose song No. 1 has part 1 with three instruments and in each instrument one loop, with part 1 having been constructed by the user. The AI system knows the auditory properties of these three loops and if the variance level is low the AI system in its selection of new loops for part 2 in the skeleton model only selects audio loops for the instruments whose auditory properties are very similar (tempo in part 1 instrument 1 loop 1 is 78—so the loop for part 2 instrument 1 is selected to have a tempo 12 (76 or 80) bpm). If the variance level is high this threshold area widens, e.g., it might widen with each step in the variance level ±4.

According to another example, a variation in the loop selection process might be introduced by adding a random amount to each value that is used in the selection of a new loop. That is, in some embodiments a parameter that represents "calmness" might be provided for each loop. This parameter might represent, e.g., the amount of dynamic variation in that loop. Assume for purposes of discussion that the value of an initial existing loop is 0.60. If, for example, the randomization amount is set to 5%, when the AI system searches for loops to include in the skeleton, the search might be broadened to include loops with calmness values between 0.57 and 0.63 and, in some embodiments, values at the extremes might be preferentially selected, with the selection among multiple qualifying loops preferably being random in some embodiments.

In other embodiments, the user might be provided with a graphical user interface that shows, e.g., the ten most prominent parameters of either each loop or the whole generated song. This GUI could also provide a control that allows the user to prioritize each parameter, with the prioritization ranging from 100% to 0%, with 0% meaning that a parameter is never considered and 100% meaning the parameter is the most important, perhaps sole, parameter considered. By manipulating the individual controls for each parameter the user will be able to instruct the AI system, e.g., to select more loops with a female singing voice (control to 100%) and completely ignore loops with aggressive mood (control to 0%). A setting of 50% for the parameter style could instruct the AI system to "mix" it up regarding the loop selection, i.e., the designated parameter is somewhat important but the AI is permitted to stray from the base style determination set by the skeleton model.

Figure 4:
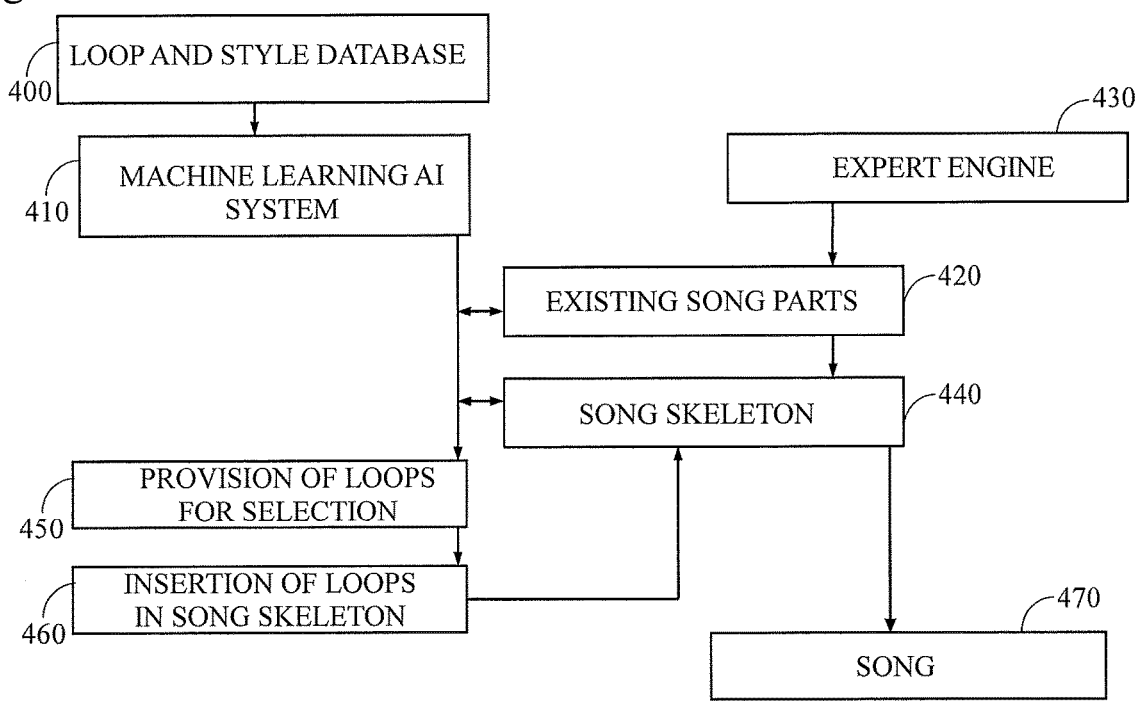
FIG. 4 depicts the functionality of the machine learning AI utilized in a variation of the instant invention.

Turning next to FIG. 4, this figure is depicting an embodiment that illustrates the functionality of the machine learning AI system 410. The system for machine based learning is constantly being trained with the complete available database of styles and the associated audio loops 400.

Constantly meaning that, as has been disclosed, the loop and style availability changes over time, with new content being added to the database and content base or removed from it with the AI constantly evaluating these changes. The AI has complete knowledge of every audio loop, its auditory properties, length, tempo, dynamic and key. Additionally the AI does know which audio loops are available locally for the user and which have to be purchased online.

Based on the song skeleton 440 generated by the expert engine 430 which utilizes any user provided existing song parts and their associated audio loops 420—and based on the information of the selected loops in the existing song parts 420 the AI selects suitable audio loops from the database for the expert engine generated song parts making up the song skeleton and automatically fills 460 the available data structures of the generated song skeleton 440 resulting in a completed song 470. In another embodiment the AI provides the determined audio loops for selection by the user 450, therewith providing more experienced users the ability to take on a more active part in the song generation process by manually deciding which audio loops to insert 460 into the song skeleton 440. The audio loop selection of the AI system is not bound by the initial style selection of the user from any existing song parts, which results in a much bigger selection horizon compared to the manual selection of audio loops by the user. The utilization of the AI disrupts the predefined "only audio loops from the selected style" selection form music generation in an innovative, efficient and time saving manner.

The selection of suitable audio loops is realized utilizing all the known data from any available initial song parts. That information being the existence of, in one embodiment, at least one song part that comprises of a length of 4 to 8 measures. Each of the potential song parts has instruments (for example drums, bass, guitar, synthesizer, vocals) selected and for each instrument at least one selected audio loop. Each audio loop is stored in a database that additionally stores its individual auditory properties as well as its association to an instrument and style. The AI system initially determines the instruments from any existing song parts and determines compatible and usable instruments in a next step—this is realized by an ad hoc judgment regarding the usability of different new audio loops from individual instruments with respect to the already inserted and selected instruments and audio loops. This ad hoc judgment provides a determination above a specific threshold level which instrument and audio loop is acceptable in the specific song part of the generated song skeleton. In a next step the different and new audio loops are selected, provided to the user and ultimately inserted into the generated song skeleton, this being carried out either automatically or upon user approval.

Figure 5:
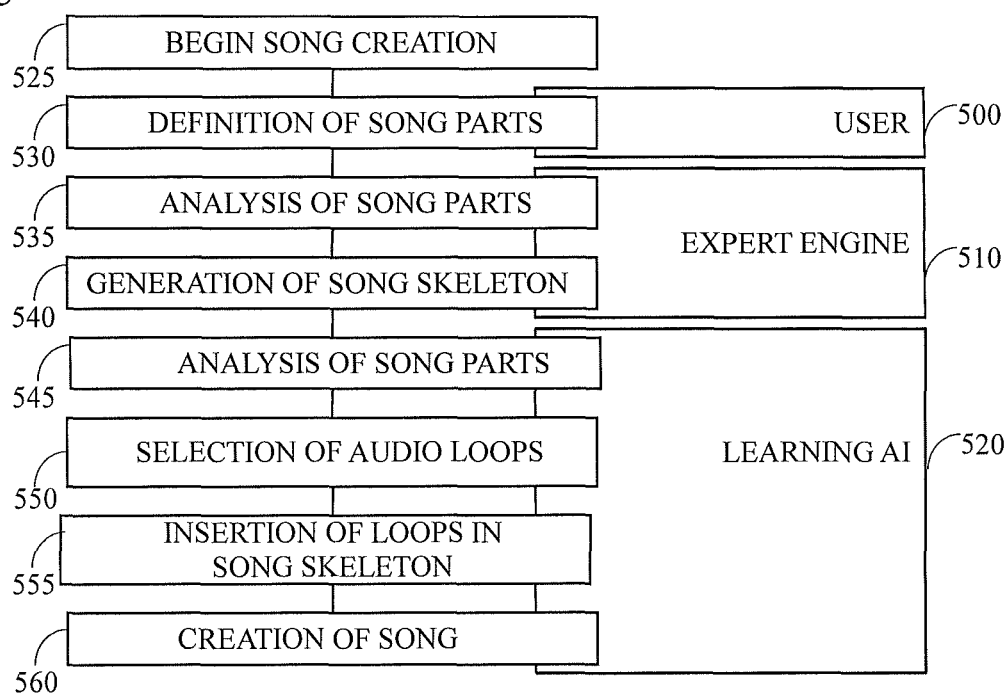
FIG. 5 is an illustration of a compressed form of the workflow of an embodiment the instant invention.

Coming next to FIG. 5, this figure is an illustration of one preferred workflow of the instant invention. As a first preferred step the user 500 initiates the song creation or generation process 525 from within a software program used for this purpose. In a next preferred step the user 500 begins the manual creation of a song or music piece by defining individual song parts (at least one) 530 and providing these song parts with style selection, instrument selection and audio loop selection. In a next preferred step, either automatically or depending on activation by the user, the expert engine 510 begins the analysis of any already generated song parts 535 and as a result of that analysis generates a song skeleton 540, representing a full song consisting of a plurality of individual song parts.

Continuing in more detail, the song skeleton generation process is initiated by the expert engine by determining the user selected style or styles from any previously song parts or any of the information provided by the user. Depending on the determination of the style the expert engine makes the following sorts of choices—it should be understood that these choices do not need to be carried out sequentially, it might also be possible that the expert engine could be configured to process the mentioned points in a different order. In one embodiment, the expert engine determines a suitable length of the target song; this might depend, for example, on the initially selected style. For example, a 12-bar blues will typically have a verse that is 12 measures long, e.g., in the key of C the progression would be C-C-C-C-F-F-C-C-G-F-C-C.

Next according to an embodiment the expert engine determines the song scheme or song skeleton—for example, "Intro—Verse 1—Verse 1 Variation—Refrain 1—Verse 2—Verse 2 Variation—Refrain 2—Verse 3—Verse 3 Variation—Refrain 3—Ending". Then pluralities of different instruments are selected, where these instruments are selected to be compatible with the selected style. The expert engine also determines harmony sequences that are typical for the selected initial style—for example for a blues style a chord change pattern of C-C-F-F-C-G-F-C (in the key of C) would be a fitting harmony or chord sequence, where the letters represent chords in one variation of a traditional 8-bar blues.

Of course, there are a number of variations of, in this example, the 8-bar blues and the expert engine would be free to choose among them. One way to do this might be to choose a skeleton randomly from among the those available. As another example, a familiar rock chord progression (in the key of G) might be G-D-E-C-G. Also the dynamics structure for the song skeleton will be determined where, for example, the dynamics will be being defined as having a step wise increase from the beginning to the end of the song, e.g., the song would tend to get louder. The expert engine also could specify the level of the variation for each to be created song part, for example a definition of how many of the audio loops in each song part could be exchanged and how much the audio loops will be allowed to differ from the audio loops selected by the user.

The data that is utilized as the basis for the expert engine is gathered from a data foundation collected from experienced song producers, wherein for each individual style a specific data set is created and stored in a database (preferably xml-based). The data will be constantly under review by these experts and will preferably be updated and varied at any time.

In a next preferred step the machine based learning AI 520 is taking into account the data from the expert engine, the generated song skeleton 540 and any user created song parts 545 or any other information given by the user and begins with the selection of audio loops 550 and inserts these audio loops into the song skeleton 550 therewith creating the song 560.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an addition" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as is fully set out at this point.

CONCLUSIONS

Of course, many modifications and extensions could be made to the instant invention by those of ordinary skill in the art. For example in one preferred embodiment an experienced user might be provided with an elaborate graphical user interface allowing the user to define specific parameter regarding the song creation. So for example a graphical user interface might be provided that allows the user to define the length of the desired song, a specific value determining the variance of the song—meaning defining how diversified the song should be and how much the song is allowed to differ from the original ideas of the user.

Additionally it might be possible for the user to control the style selection—defining which styles are usable by the AI and which are off limits—with a strict limitation option as well as a variable option, wherein the strict limitation defines desired and non desired styles and the variable limitation is depending on the variance setting. Furthermore the user might be allowed to influence the harmony setting, defining which keys the song should be using. Also a determination of the dynamic scheme might be possible, allowing the user to define a dynamic curve for the song.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of hybrid AI/expert engine-based song generation, wherein is provided an audio loop database containing a plurality of audio loops, each of said audio loops having a plurality of performance parameters associated therewith, comprising the steps of:
   (a) requiring a user to select a music style from among a plurality of music styles
   (b) requiring the user to select at least one initial song part different from any audio loop in said audio loop database;
   (c) using an expert engine to automatically analyze said selected at least one song part to produce a song skeleton structure based on said selected music style and said at least one song part, said song skeleton structure comprising a plurality of empty skeleton song parts, each of said empty skeleton song parts being associated with one or more expert parameters provided by said expert system;

(d) adding said user provided song part to at least one of said empty skeleton song parts in said song skeleton structure;

(e) for each of said skeleton song parts not containing said user provided song part, using an AI system to select a plurality of audio loops from said audio loop database to add to said each of said empty skeleton song parts in said song skeleton structure, said AI system selecting said plurality of said audio loops using at least said plurality of performance parameters associated with each audio loop in said database together with said expert parameters associated with each of said skeleton song parts;

(f) for each of said skeleton song parts not containing said user provided song part, adding said selected audio loops to each of said empty skeleton song part in said song skeleton structure, thereby generating a music work containing at least one of said at least one song parts selected by the user and at least one of said at least one skeleton song parts containing only audio loops added by said AI system, said song skeleton structure comprising a hybrid AI/expert engine-based song; and (g) performing at least a portion of said hybrid AI/expert engine-based song for the user.

2. The method according to claim 1, wherein said at least one initial song part selected by the user comprises a plurality of different recorded instruments.

3. The method according to claim 1, wherein said expert parameters comprise a collection of rules associated with each provided music style.

4. The method according to claim 1, wherein step (e) comprises the steps of:

(e1) using said audio loops in said audio loop database and said performance parameters associated therewith to train said AI system, and (e2) for each of said skeleton song parts not containing said user provided song part, using an AI system to select a plurality of audio loops from said audio loop database to add to said each of said empty skeleton song parts in said song skeleton structure, said AI system selecting said plurality of said audio loops using at least said plurality of performance parameters associated with each audio loop in said database together with said expert parameters associated with each of said skeleton song parts.

5. The method according to claim 1, wherein said skeleton structure comprises at least a skeleton structure song length, a skeleton structure song style, a plurality of skeleton structure song part types, a plurality of skeleton structure instruments, at least one skeleton structure harmony sequence, a skeleton structure, a dynamics dramaturgy and a skeleton structure variance setting.

6. The method according to claim 5, wherein said variance setting comprises a permitted level of diversity of an AI selected loop with respect to any previously inserted audio loops.

7. The method according to claim 1, wherein said expert parameters comprise one or more of:
(i) a runtime at a given tempo,
(ii) a song part style designation,
(iii) one or more permitted instruments,
(iv) a harmonic progression,
(v) a chord change progression,
(vi) a variance setting,
(vii) a dynamics dramaturgy, and
(viii) a percussion pattern.

8. A method of hybrid AI/expert engine-based song generation, wherein is provided an audio loop database containing a plurality of audio loops, each of said audio loops having a plurality of performance parameters associated therewith, comprising the steps of:

(a) requiring a user to select a music style from among a plurality of music styles (b) requiring the user to select at least one initial song part different from any audio loop in said audio loop database;

(c) using an expert engine to automatically analyze said selected at least one song part to produce a song skeleton structure based on said selected music style and said at least one song part, said song skeleton structure comprising a plurality of empty skeleton song parts, each of said empty skeleton song parts being associated with one or more expert parameters provided by said expert system, wherein said expert parameters comprise one or more of:
(i) a runtime at a given tempo,
(ii) a song part style designation,
(iii) one or more permitted instruments,
(iv) a harmonic progression,
(v) a chord change progression,
(vi) a variance setting,
(vii) a dynamics dramaturgy, and
(viii) a percussion pattern;

(d) adding said user provided song part to at least one of said empty skeleton song parts in said song skeleton structure;

(e) for each of said skeleton song parts not containing said user provided song part, using an AI system to select a plurality of audio loops from said audio loop database to add to said each of said empty skeleton song parts in said song skeleton structure, said AI system selecting said plurality of said audio loops using at least said plurality of performance parameters associated with each audio loop in said database together with said expert parameters associated with each of said skeleton song parts;

(f) for each of said skeleton song parts not containing said user provided song part, adding said selected audio loops to each of said empty skeleton song part in said song skeleton structure, thereby generating a music work containing at least one of said at least one song parts selected by the user and at least one of said at least one skeleton song parts containing only audio loops added by said AI system, said song skeleton structure comprising a hybrid AI/expert engine-based song; and (g) performing at least a portion of said hybrid AI/expert engine-based song for the user.

9. The method according to claim 8, wherein said at least one initial song part selected by the user comprises a plurality of different recorded instruments.

10. The method according to claim 8, wherein said expert parameters comprise a collection of rules associated with each provided music style.

11. The method according to claim 8, wherein step (e) comprises the steps of:

(e1) using said audio loops in said audio loop database and said performance parameters associated therewith to train said AI system, and (e2) for each of said skeleton song parts not containing said user provided song part, using an AI system to select a plurality of audio loops from said audio loop database to add to said each of said empty skeleton song parts in said song skeleton structure, said AI system selecting said plurality of said audio loops using at least said plurality of performance parameters associated with each audio loop in said database together with said expert parameters associated with each of said skeleton song parts.

12. The method according to claim 8, wherein said skeleton structure comprises at least a skeleton structure song length, a skeleton structure song style, a plurality of skeleton structure song part types, a plurality of skeleton structure instruments, at least one skeleton structure harmony sequence, a skeleton structure, a dynamics dramaturgy and a skeleton structure variance setting.

13. The method according to claim 8, wherein said variance setting comprises a permitted level of diversity of an AI selected loop with respect to any previously inserted audio loops.

\* \* \* \* \*